US007650938B2

(12) United States Patent
Hall et al.

(10) Patent No.: US 7,650,938 B2
(45) Date of Patent: Jan. 26, 2010

(54) RESIDENTIAL IN-WELL INTERNAL WATER AERATOR

(76) Inventors: Thomas G. Hall, P.O. Box 9793, Berkeley Springs, WV (US) 25411; Veta B. Hall, P.O. Box 979, Berkeley Springs, WV (US) 25411

( * ) Notice: Subject to any disclaimer, the term of this patent is extended or adjusted under 35 U.S.C. 154(b) by 292 days.

(21) Appl. No.: 11/255,110

(22) Filed: Oct. 21, 2005

(65) Prior Publication Data
US 2006/0096904 A1    May 11, 2006

(51) Int. Cl.
*E21B 43/38* (2006.01)

(52) U.S. Cl. .......... 166/265; 166/235; 95/241; 96/203; 96/219

(58) Field of Classification Search ........ 166/265, 166/235, 369; 96/155, 203, 219; 95/241, 95/245, 263; 210/202
See application file for complete search history.

(56) References Cited

U.S. PATENT DOCUMENTS

| | | | | |
|---|---|---|---|---|
| 3,014,532 A * | 12/1961 | Eging | .............. | 166/85.2 |
| 4,412,924 A * | 11/1983 | Feather | .............. | 210/744 |
| 4,508,545 A * | 4/1985 | DeLoach | .............. | 95/258 |
| 5,045,215 A * | 9/1991 | Lamarre | .............. | 210/747 |
| 5,104,554 A * | 4/1992 | Dempsey | .............. | 210/747 |
| 5,865,995 A * | 2/1999 | Nelson | .............. | 210/205 |
| 6,054,046 A * | 4/2000 | Nelson | .............. | 210/194 |
| 6,096,219 A * | 8/2000 | Green et al. | .............. | 210/695 |
| 6,287,369 B1 * | 9/2001 | Osmond | .............. | 96/202 |
| 6,349,765 B1 * | 2/2002 | Meyers et al. | .............. | 166/85.2 |
| 6,372,024 B1 * | 4/2002 | Prescott et al. | .............. | 95/263 |
| 6,557,633 B2 * | 5/2003 | Abouodah | .............. | 166/265 |
| 6,706,094 B2 * | 3/2004 | Browne | .............. | 95/241 |
| 6,783,676 B2 * | 8/2004 | Jensen | .............. | 210/602 |
| 7,018,530 B2 * | 3/2006 | Pollock | .............. | 210/194 |
| 7,094,341 B2 * | 8/2006 | Max | .............. | 210/170.11 |
| 7,255,133 B2 * | 8/2007 | Meyers et al. | .............. | 138/30 |
| 2004/0231513 A1 * | 11/2004 | Perkins et al. | .............. | 95/263 |

\* cited by examiner

Primary Examiner—Shane Bomar

(57) ABSTRACT

A Residential In-well Internal Water Aerator for reducing/eliminating iron, Hydrogen sulfide, and radon gas is a device that hangs within the well casing. Its support is achieved by the well cap. It is capable of degassing hydrogen sulfide and radon gas and precipitation of the iron to become a solid and attaching its self to the interior walls and drip screens of the Residential In-well Internal Water Aerator within the well, thus reducing/eliminating the stained fixtures, bad smell and the risk of radon gas from within the residence.

4 Claims, 10 Drawing Sheets

RESIDENTIAL IN-WELL INTERNAL WATER AERATOR

BACKGROUND OF THE INVENTION

1. Field of the Invention

The present invention relates generally to a water aerator and more specifically it relates to a Residential In-well Internal Water Aerator for the reduction/elimination of iron, hydrogen sulfide (rotten egg smell) and radon gas in residential wells.

2. Description of the Related Art

It can be appreciated that water aerators have been in use for years. Typically, water aerators are comprised of individual units which stand alone and are separate from the pump and delivery system of existing water systems. The main problem with conventional water aerators is the cost factor required in their set up. Another problem with conventional water aerators is that they are water aerators is the amount of property that is required to install the reservoir or tower. Requirements to achieve the desired aeration process with other water aerators such as mechanical water aerator systems, is the secondary power cost, as well as the ongoing maintenance costs.

While these devices may be suitable for the particular purpose to which they address, they are not as suitable for the average residential well in the reduction/elimination of iron, hydrogen sulfide (rotten egg smell) and radon gas. The main problem with conventional water aerators is that they are impractical for the average residence due to the cost factor involved in continuing maintenance, building specialty units and or the construction of a aeration spillway/aeration tower etc. Another problem with mechanical water aerator systems is the amount of property required to install the above aforementioned devices. Another problem with mechanical water aerator systems is the ongoing power and maintenance cost along with the number of pieces of equipment necessary for the aerator to function properly and be fault free. In these respects, the Residential In-well Internal Water Aerator according to the present invention substantially primarily located in reservoirs and water towers. Another problem with conventional departs from the conventional concepts and designs of the prior art, and in so doing provides an apparatus primarily developed for the purpose of the reduction/elimination of iron, hydrogen sulfide (rotten egg smell) and radon gas.

SUMMARY OF THE INVENTION

In view of the foregoing disadvantages inherent in the known types of water aerators now present in the prior art, the present invention provides a new Residential In-well Internal Water Aerator construction wherein the same can be utilized for the reduction/elimination of iron, hydrogen sulfide and radon gas at the well site.

The general purpose of the present invention, which will be described subsequently in greater detail, is to provide a new Residential In-well Internal Water Aerator that has many of the advantages of the water aerator mentioned heretofore and many novel features that result in a new Residential In-well Internal Water Aerator which is not anticipated, rendered obvious, suggested, or even implied by any of the prior art water aerator, either alone or in any combination thereof.

To attain this, the present invention generally comprises an aerator nozzle and controls, UV light (optional) drip chambers, GAC (granular activated charcoal) filter chambers in sequence. Each section screws together to create an apparatus that hangs from the well cap. The water is pumped to the aerator by the well pump where the water is misted/aerated and drips through the series of drip screens, UV light (optional in drip chamber #5), two GAC (granular activated carbon) filters to improve the taste and odor. The aeration in turn creates the degassing process of hydrogen sulfide, radon gas, and the precipitation process of iron.

This process is a continual recirculation of the water in the well, and allows the Residential In-well Internal Water Aerator to become an iron trap and a degassing chamber away from the premises and within the well casing, therefore continuously reducing the iron content and the degassing of the hydrogen sulfide and radon gas in the water provided to the residence. The Residential In-well Internal Water Aerator will need to be maintained on an as need basis. On a semi regular basis the control valve to the Residential In-well Internal Water Aerator needs to be exercised (closed and opened). This in turn flushes the nozzle and helps prevent the nozzle from clogging. The higher the iron content of the raw water source the more frequently the cleaning process of the Residential In-well Internal Water Aerator will be required. This involves pulling the unit from within the well casing, hosing it down (washing off the iron solids), and reinserting it into the well. This process can be done in about 30 to 40 minutes. This is not a stand alone system. Water is supplied to the Residential In-well Internal Water Aerator by a tap into the main water pipe of the residence directly from the pump at the well casing. Tap may also be done in the garage or basement for easy access to controls. The Residential In-well Internal Water Aerator is a leach system using existing pumps and pipes in turn supplies and rotates the raw source water in the well.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a Residential In-well Internal Water Aerator that will overcome the shortcomings of the prior art devices. An object of the present invention is to provide a Residential In-well Internal Water Aerator that reduces/eliminates iron, hydrogen sulfide (rotten egg smell), and radon gas in residential wells.

Another object is to provide a Residential In-well Internal Water Aerator that is a chemical free answer for the reduction/elimination of iron, hydrogen sulfide (rotten egg smell), and radon gas from residential wells.

Another object is to provide a Residential In-well Internal Water Aerator that is economical and can be afforded by all in need.

Another object is to provide a Residential In-well Internal Water Aerator that does not have a continuous chemical replacement factor.

Another object is to provide a Residential In-well Internal Water Aerator that has no moving parts to wear out and DOES NOT require the continual replacement of certain segments of the equipment.

Another object is to provide a Residential In-well Internal Water Aerator that has a simplified maintenance program that the average homeowner can handle.

Another object is to provide a Residential In-well Internal Water Aerator that keeps the unpleasant smell of hydrogen sulfide away from the residence.

Another object is to provide a Residential In-well Internal Water Aerator that traps significant amounts of the iron on the apparatus and not on the fixtures and appliances in the residence.

Another object is to provide a Residential In-well Internal Water Aerator that greatly reduces/eliminates radon gas in the well water.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
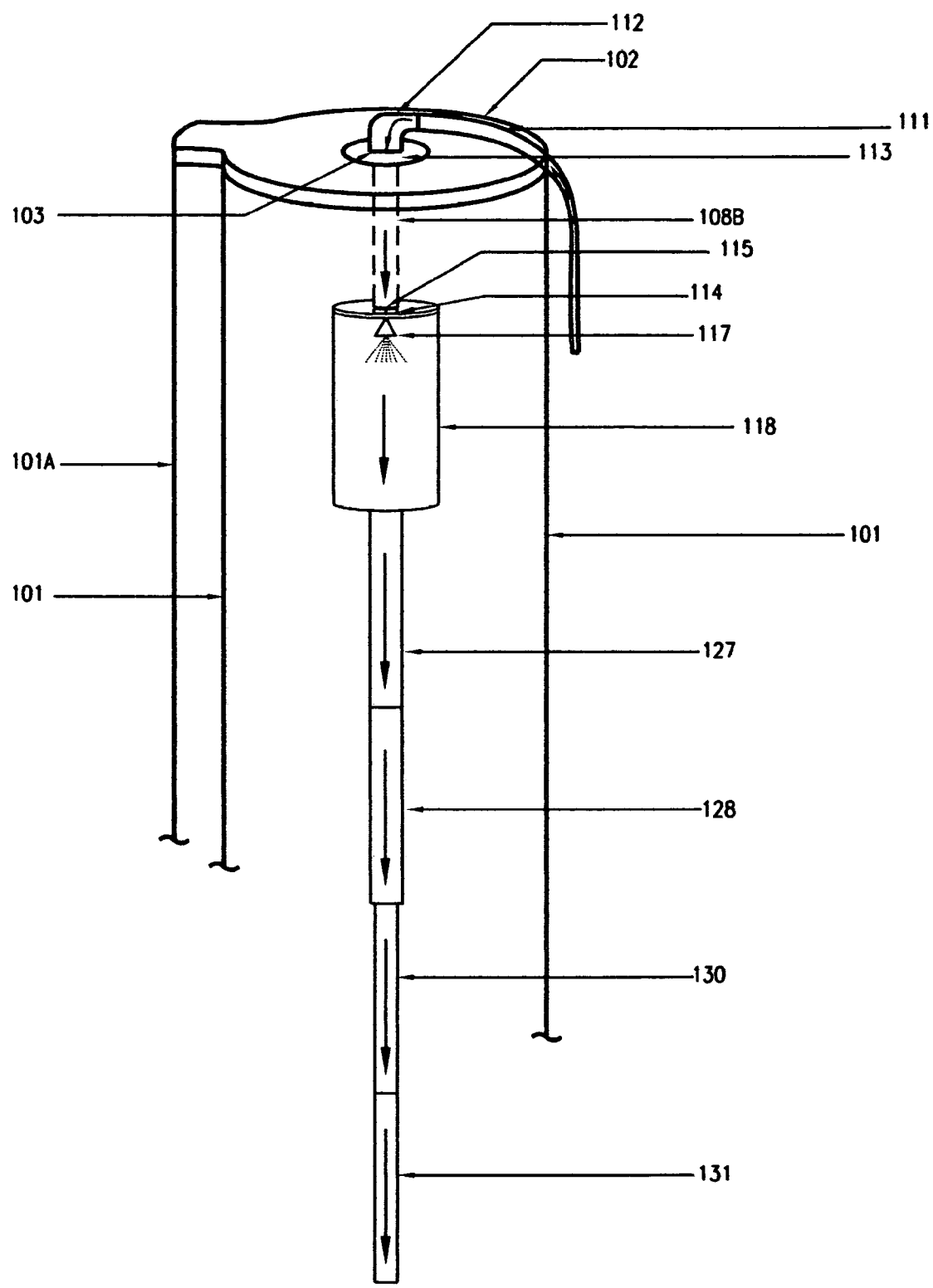
FIG. 1 is a perspective view of the present invention showing the inside of the well casing.

Turning now descriptively to the drawings, in which similar reference characters denote similar elements throughout the several views, the attached figures illustrate a Residential In-well Internal Water Aerator which comprises a series of chambers attached together by conventional means. This is NOT a stand alone system. The Water/H2O is supplied to the Residential In-well Internal Water Aerator by a tap into the main water supply pipe line of the house directly from the pump at the well casing.

Figure 7:
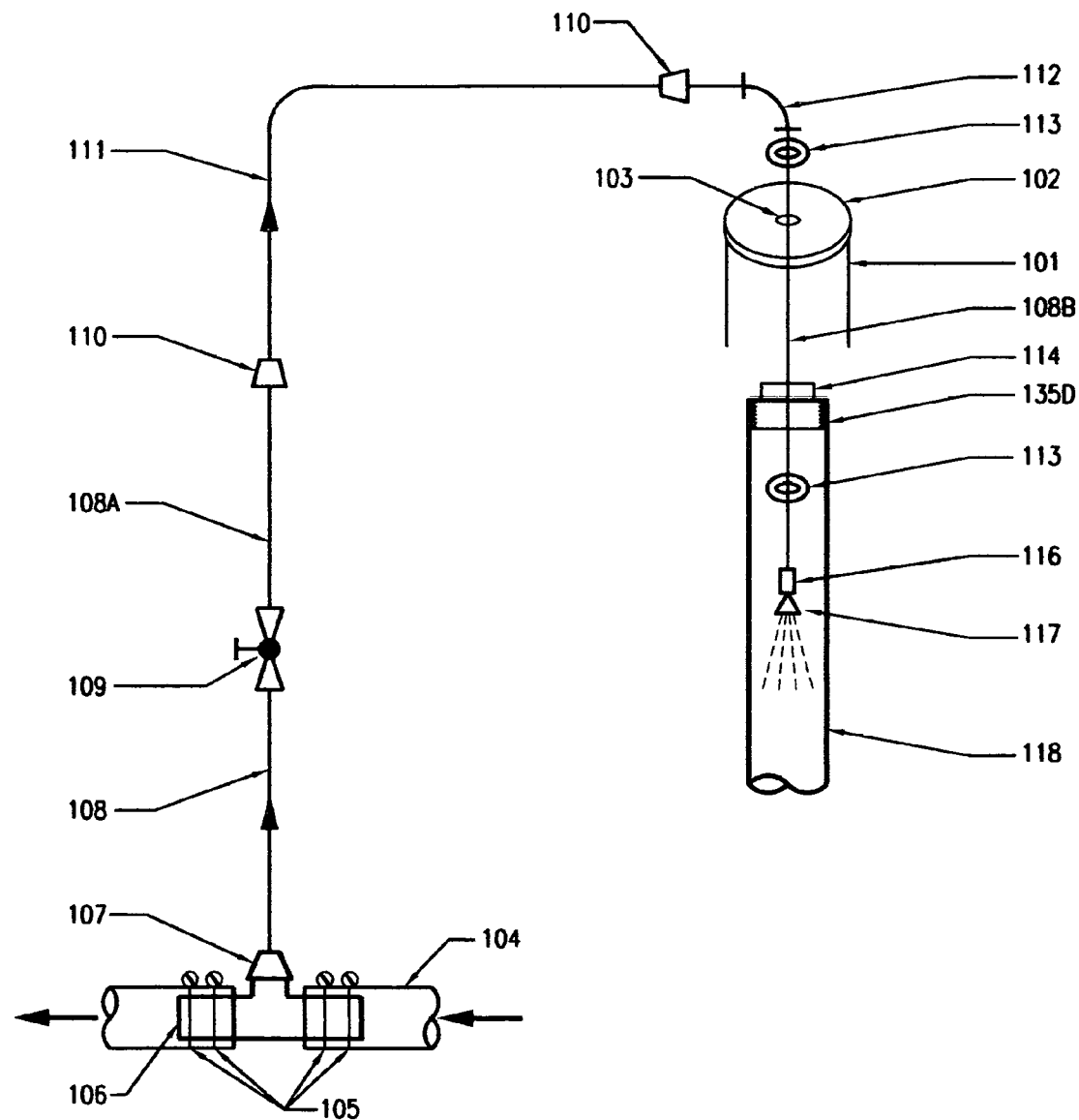
FIG. 7 is an exploded overview of the present invention showing all of the components/specifications of chamber the supply controls/nozzle apparatus installed in the fifth chamber.

FIG. 1. illustrates a perspective view of the invention within the well casing 101. The high pressure tubing 111 as shown in FIG. 7 connects to a 90 degree street ell 113 that is connected to a nipple 108B, a clean out plug 114, a flat washer 113, a galvanized coupler 116 and nozzle 117 from which the misting begins the aeration/drip process within the said Residential In-well Internal Water Aerator. (The water supply process will be explained in more detail in FIG. 7). The street ell/nozzle apparatus is the basis which allows the Residential In-well Internal Water Aerator to hang from the well cap 102. The aeration/drip process takes place inside five 5-foot chambers, 118, 127, 128, 130, and 131 which are screwed together to hang from the well cap 102.

Figure 2:
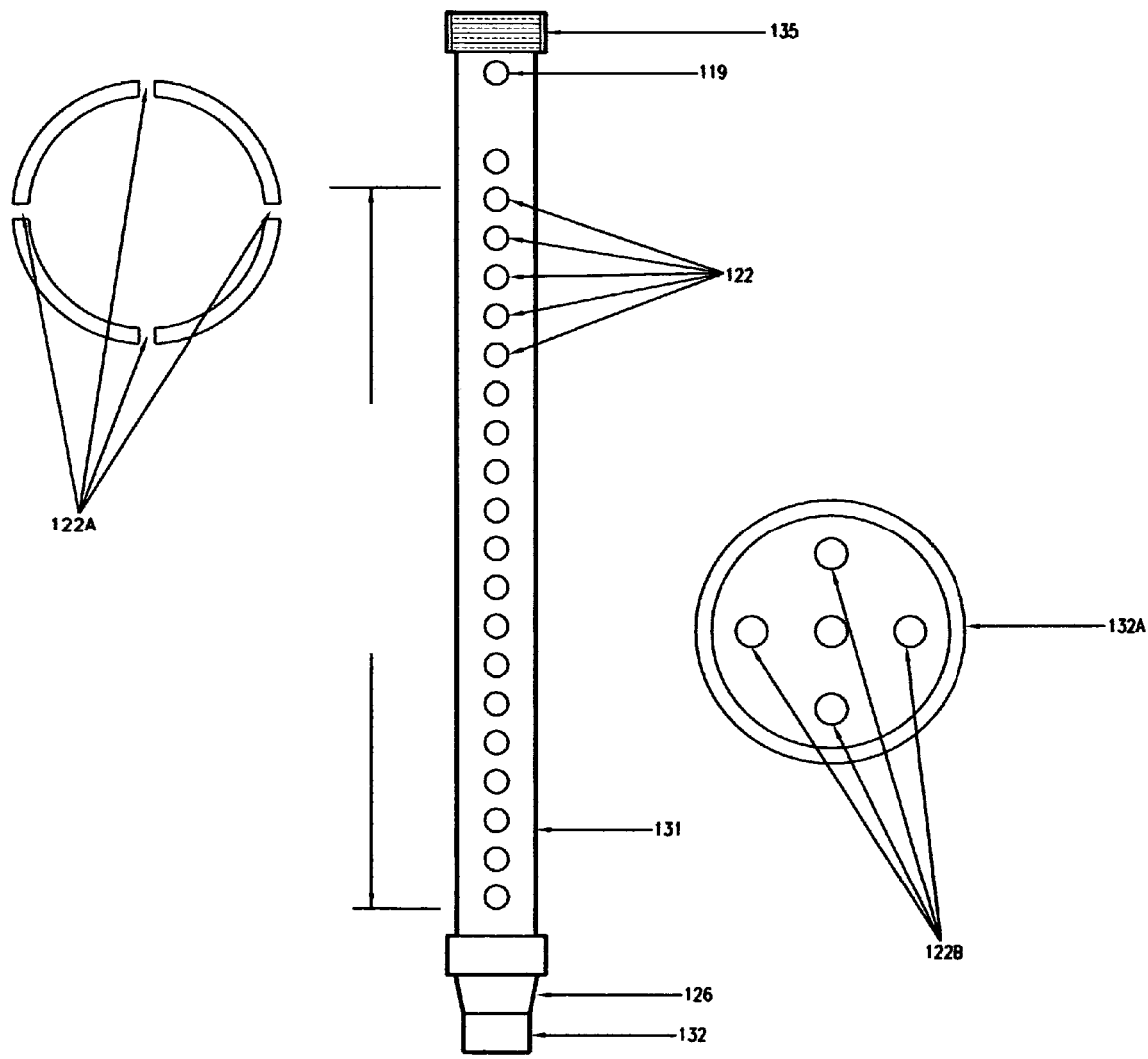
FIG. 2 is a an Exploded/cross section view of the present invention showing all of the components of the first chamber GAC (granular activated carbon)/degassing/drip through chamber.

FIG. 2 illustrates an exploded/cross section view of the first chamber 131 to be inserted into the well casing 101 and is comprised of a pvc pipe with GAC (Granular Activated Carbon) filtering media for the purpose of taste/odor control of hydrogen sulfide removal and degassing ports 122 and (122A for a top view of same). There is a male adapter 126 at the bottom of the first chamber 131 and a female adapter 135 at the top of the first Chamber 131 for the purpose of attaching to the second chamber 130. Two grommets 122 have been placed near the top for the purpose of securing a ¼" nylon safety line. Two installation port holes 119 are drilled through the chamber 131 2" from the top for the purpose of inserting the installation rod 120 (FIG. 10) during installation and removal of the Residential In-well Internal Water Aerator in/from the well casing 101, allowing for hands free installation/removal.

Figure 3:
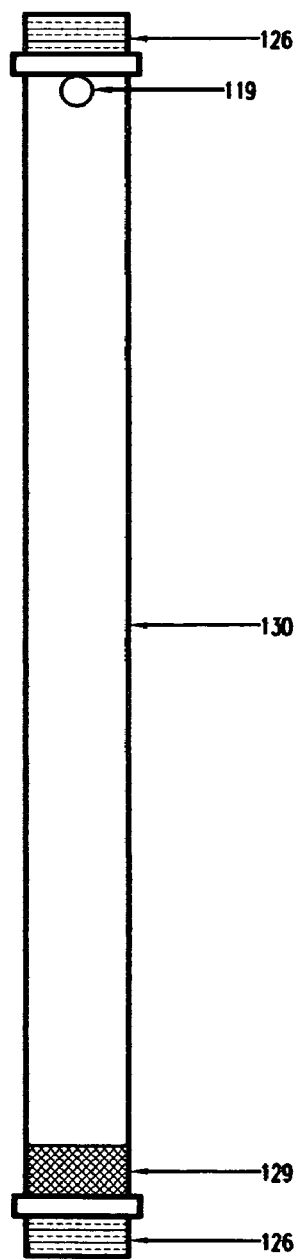
FIG. 3 is an exploded view of the present invention showing all of the components of the second Chamber GAC/drip through chamber.

FIG. 3 is an exploded/cross section view of the second chamber 130 to be inserted into the well casing 101 and is comprised of a pvc pipe with GAC filtering media for the purpose of odor/taste control of hydrogen sulfide removal. There is a male adapter 126 at the bottom of the second chamber 130 for the purpose of attaching to the first chamber 131. A male adapter 126 is located at the top of the second chamber 130 for the purpose of attaching to the third chamber 128. At the bottom of the second chamber 130 immediately above the male adapter 126 is a fiber ventilation plug 129 to prevent the loss of GAC filtering media but allowing the water to flow through. Two installation port holes 119 are drilled through the chamber 130 2" from the top for the purpose of inserting the installation rod 120 (FIG. 10) during installation and removal of the Residential In-well Internal Water Aerator in/from the well casing 101, allowing for hands free installation/removal.

Figure 4:
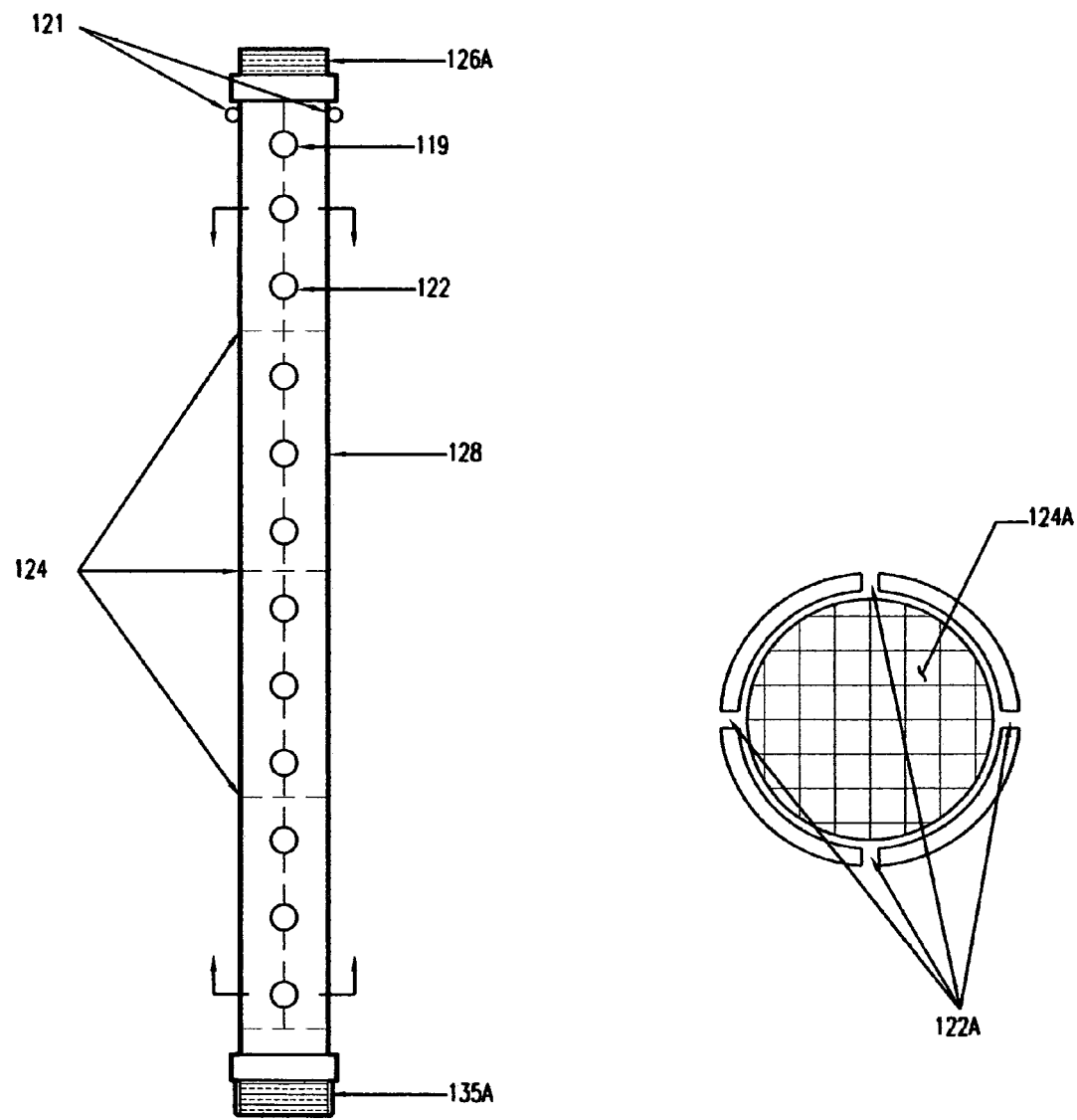
FIG. 4 is an exploded/cross section view of the present invention showing all of the components of the third chamber aeration/degassing/drip chamber.

FIG. 4 is an exploded/cross section view of the third chamber 128 to be installed into the well casing 101 and is comprised of a pvc pipe with degassing ports 122 and (122A for the top view of same and internal drip aerator screens 124 and (124A for the top view of the same) inserted vertically into the third chamber 128. Two installation port holes 119 are drilled through the third chamber 128 2" from the top for the purpose of inserting the installation rod 120 (FIG. 10) during installation and removal of the Residential In-well Internal Water Aerator in/from the well casing, allowing for hands free installation/removal.

Figure 5:
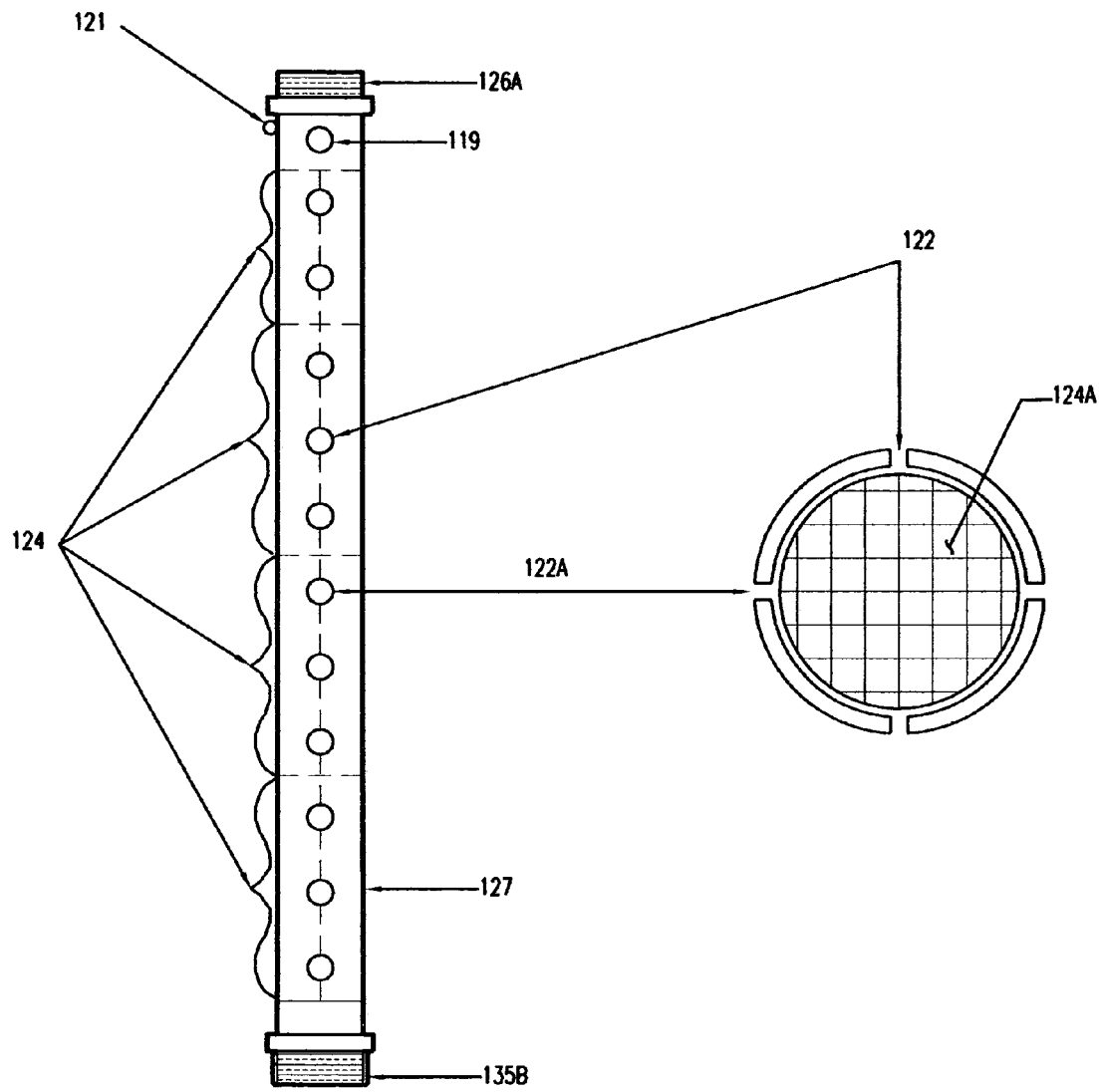
FIG. 5 is an exploded/cross section view of the present invention showing all of the components of the fourth Chamber aeration/degassing/drip chamber.

FIG. 5 is an exploded/cross section view of the fourth chamber 127 to be inserted into the well casing 101 and is comprised of a pvc pipe with degassing ports 122 and (122A for the top view of the same), and internal drip aerator screens 124 and (124A for the top view of same) (FIG. 8) inserted vertically into the fourth chamber 127. There is a female adapter 135B at the bottom of the fourth chamber 127 and a male adapter 126A at the top of the fourth chamber 127. Two installation port holes 119 are drilled through the fourth chamber 127 2" from the top for the purpose of inserting the installation rod 120 (FIG. 10) during installation and removal of Residential In-well Internal Water Aerator in/from the well casing, allowing for hands free installation/removal.

Figure 6:
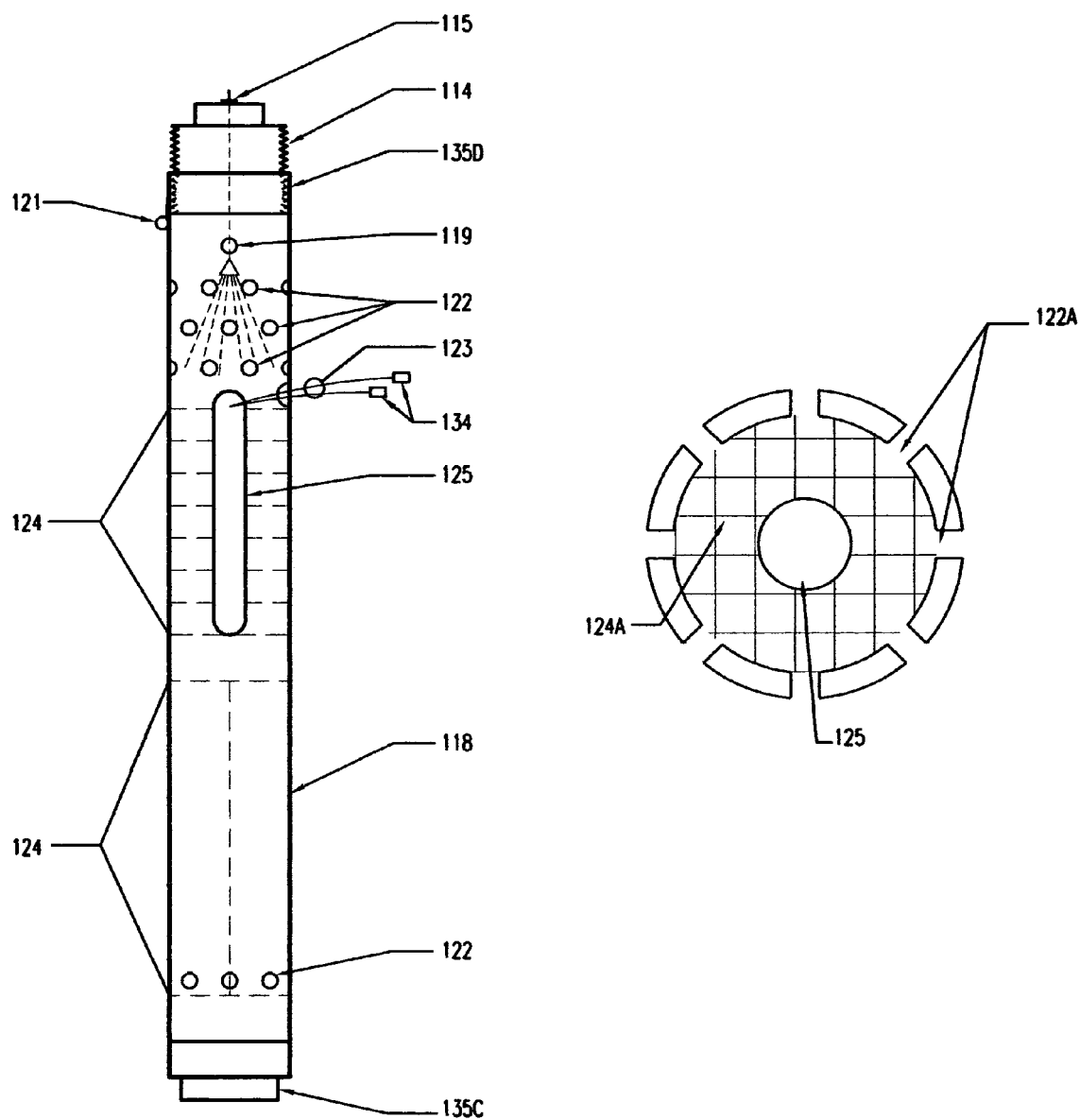
FIG. 6 is an exploded/cross section view of the present invention showing all of the components/specification of the fifth chamber aeration/degassing/drip chamber with optional UV lamp.

FIG. 6 is an exploded/cross section view of the fifth and final chamber 118 to be inserted into the well casing 101 and is comprised of a pvc pipe with degassing ports 122 and (122A for a top view of the same) and internal drip aerator screens 124 and (124A for a top view of same) are inserted vertically into the fifth chamber 118. This component has a female adapter 135C at the bottom of the fifth chamber 118, and a female adapter 135D at the top of the fifth chamber 118 with a cleanout plug 114.

The cleanout plug 114 has a hole an access port 115, drilled in the top for the purpose of inserting the nozzle apparatus FIG. 7 108B, 113, 116 and 117 to be further explained in FIG. 7 which in turn mists the water starting the aeration process. An optional UV light 125 (126A 125A for a top view of same) can be centrally inserted into the fifth drip chamber 118 held in place by the internal drip aeration screens 124 (124A for a top view of same). Two installation port holes 119 are drilled through the fifth chamber 2" down from the top for the purpose of inserting the installation rod 120 (FIG. 10) during installation and removal of Residential In-Well Internal Water Aerator in/from the well casing 101, allowing for hands free installation/removal.

FIG. 7 is an exploded/overview showing the water supply/controls for the Residential In-Well Internal Water Aerator. It will be necessary to expose an area about not less than 2' wide by 4' long to provide access to of the primary water supply line 104 from the pump to the house on the outside of the well casing 101 to allow for the necessary tap. A hole will also need to be drilled offset of center in the top of the well casing cap 102. (Be sure to note the location of the existing pitless adapter or well seal before drilling the hole in order to allow room for the Residential In-Well Internal Water Aerator in the well casing.). The tap will be made by cutting the primary water supply line 104 and inserting a tee 106 held in place by two hose clamps 105, on each side of the supply tee 107 that is inserted into the primary water supply line 104. A bushing 107, is inserted into the tee 106, followed by a nipple 108, a ball valve 109, nipple 108A, tubing adapter 110, high pressure tubing 111, an adapter 110, 90 degree street ell 112, a flat washer 113, a nipple 108B, inserts through a flat washer 113, a galvanized coupler 116 and a spray nozzle 117. The street ell 112 becomes the support bracket on the topside of the well casing cap 102 for the Residential In-well Internal Water Aerator Residential In-well Internal Water Aerator. Three nozzles 117 are included interchangeable for light iron, medium iron, or heavy iron concentration in the well water. This allows the customer to customize the Residential In-Well Internal Water Aerator to their individual need.

Figure 8:
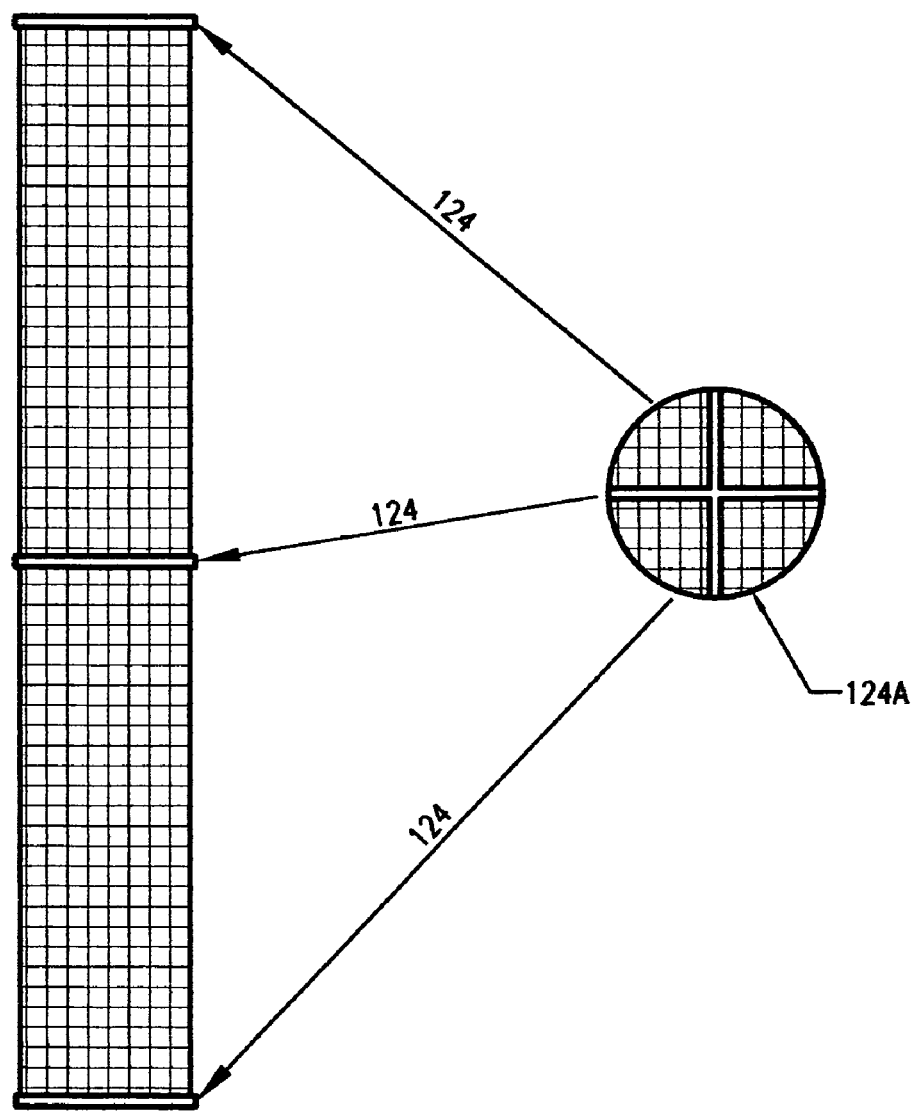
FIG. 8 is an exploded/cross section view of the present invention showing all of the components/specification of the present aerator screens.

FIG. 8 is an exploded/cross section view showing an internal drip aeration screen 124 in detail (124A top view of same) for the third chamber 128 fourth chamber 127 and fifth chamber 118. A total of four internal drip aeration screens (each 13¼" lone and range from 1¼" to 2" in diameter) are inserted vertically into each of the third chamber 128 fourth chamber 127 and fifth chamber 118. Once the water is misted into the fifth chamber 118 it goes through a drip process by which hydrogen sulfide is degassed. Additionally suspended iron solutions are precipitated into a solid that attaches to the drip screens thereby reducing iron solids from the raw water source.

Figure 9:
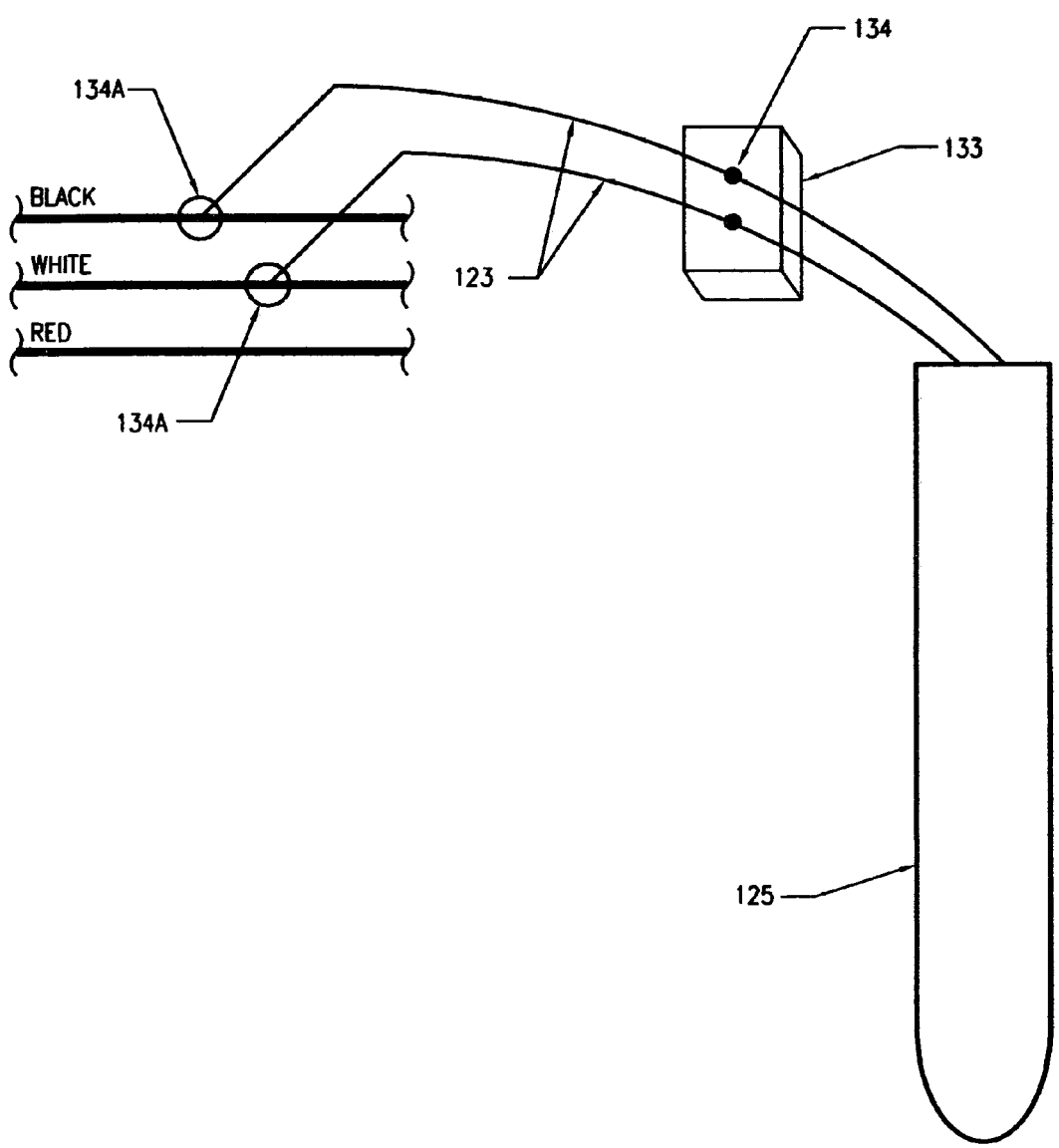
FIG. 9 is an exploded view of the present invention showing the optional UV light in place in the fifth chamber

FIG. 9 is an exploded view of an optional UV light 125 to be centrally inserted into the fifth drip chamber 118 held in place by the internal drip aeration screens 124. The electrical wire includes the waterproof hook-up wire leads 123, waterproof electrical box 133, twist on wire connectors for UV light internal source 134, and waterproof wire connectors for external source 134A which in turn requires an electrical hook-up at the pump site.

Figure 10:
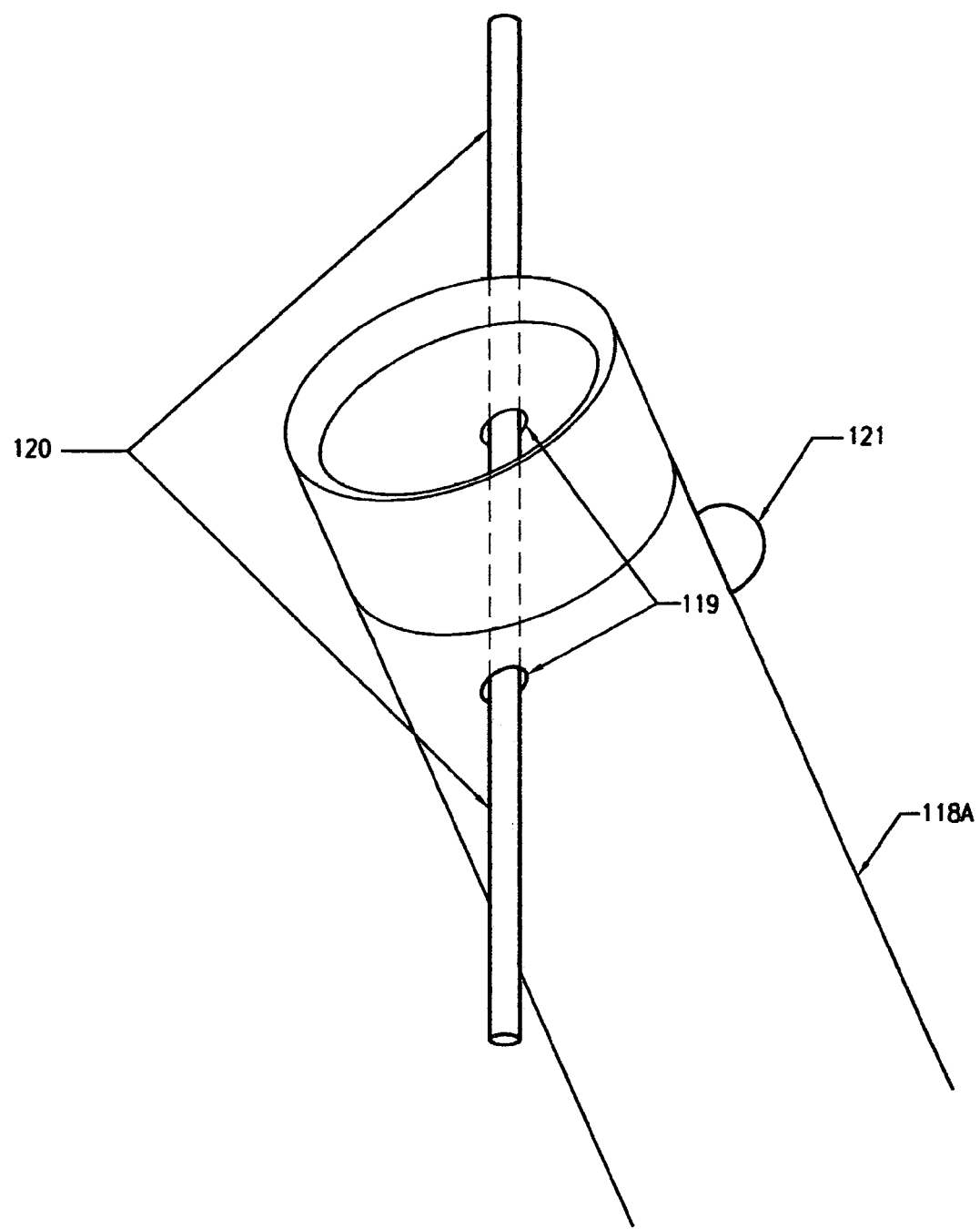
FIG. 10 is an exploded view of the present invention showing the installation rod in place in the fifth chamber (applicable in all 5 chambers) during installation and removal in/from the well casing.

FIG. 10 is an exploded view showing the installation rod 120 in place in the fifth chambers 118 (also applicable in the fourth chamber 127, third chamber 128, second chamber 130 and first chamber 131) during installation and removal of Residential In-well Internal Water Aerator in/from the well casing 101 allowing for hands free installation/removal. Alternatively, the third chamber 128, fourth chamber 127, and fifth chamber 118 (FIGS. 4, 5, and 6) may need to be modified per size of the well casing 101 and placement of the pitless adapter/well seal in each individual well. Another alternative to the tap in the primary water supply line may vary depending upon the use of pvc, galvanized, brass or other piping material 104. Another alternative is if the user chooses to run a high pressure tubing line 111 from the well casing to the basement or garage so the ball valve 109 can may be located inside the basement or garage. Another alternative is using drip screens in place of GAG with or without GAG. Another alternative is the use of green sand or zeolite in place of GAC. Another alternative is that the pattern of the aerator drip screens 124 and (124A for a top view of the same) may be round instead of square. Another alternative would be a single aeration screen approximately 53" long. Another alternative is with or without UV light 125. In the cases with UV light 125 the UV exposure will meet or exceed N.S.F. (National Sanitation Foundation) minimum requirements. The UV light 125 will require water proof wire leads 123, a waterproof electrical box 133, wire nuts connectors 134 and 134A and waterproof tape 137. The UV power source will may come from the pump power source at the well site. For this option a utility box will need to be added at the well site.

What is claimed as being new and desired to be protected by Letters Patent of the United States is as follows:

1. A Residential In-well International Water Aerator system for receiving gas and iron laden water from a raw water source and delivering potable water to a service line, wherein amounts of iron, and hydrogen sulfide have been greatly reduced/eliminated from the water, the system comprising: a water aerator; said water aerator having first and second chambers, said first and second chambers comprising GAC (Granular Activated Carbon) for taste and odor control; third, fourth, and fifth chambers with degassing ports and a series of drip screens in each of said chambers; a nozzle/aerator arranged in flow communication with the raw water source, through which water is introduced into said residential in-well internal water aerator system; supply line controls, arranged in flow communications with the raw water source, through which the flow of water is controlled by a ball valve to the nozzle/aerator of the residential in-well internal water aerator system; and a tee spliced into the supply line at the outer edge of a well casing to arrange flow communication with the raw water source and supply line controls through which the water is introducible into said nozzle/aerator of the residential in-well internal water aerator system.

2. The Residential In-well International Water Aerator system of claim 1, further comprising: a UV light introduced into the fifth chamber to offer bacteria control within the Residential In-well Internal Water Aerator.

3. The Residential In-well International Water Aerator system of claim 1, further comprising: a series of aeration chambers with aeration chamber degassing port to act as a collection agent for iron and degassing for said hydrogen sulfide.

4. The Residential In-well International Water Aerator system of claim 1, further comprising: removing said aerator from said well casing at least once every six months whereby iron solids and sediment are removed by hosing down said aerator at which time said aerator can be reinserted into said well casing.

* * * * *